(12) United States Patent
Mori et al.

(10) Patent No.: US 8,607,918 B2
(45) Date of Patent: Dec. 17, 2013

(54) MOTORCYCLE ENGINE

(75) Inventors: Hidemichi Mori, Wako (JP); Kazuhisa Takemoto, Wako (JP); Tomio Onosato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 289 days.

(21) Appl. No.: 12/725,064

(22) Filed: Mar. 16, 2010

(65) Prior Publication Data

US 2010/0243366 A1  Sep. 30, 2010

(30) Foreign Application Priority Data

Mar. 30, 2009 (JP) .................................. 2009-081651

(51) Int. Cl.
*B60K 13/04* (2006.01)

(52) U.S. Cl.
USPC ............................ 180/296; 180/219; 180/309

(58) Field of Classification Search
USPC ............... 180/9.25, 89.2, 219, 255, 291, 296, 180/309, 223, 68.3, 68.4, 225
See application file for complete search history.

(56) References Cited

U.S. PATENT DOCUMENTS

| 4,475,622 | A | * | 10/1984 | Tsunoda et al. | 181/227 |
| 4,881,614 | A | * | 11/1989 | Hoshi et al. | 180/225 |
| 2008/0110687 | A1 | * | 5/2008 | Miyashiro et al. | 180/296 |
| 2008/0121455 | A1 | * | 5/2008 | Ishida | 180/219 |
| 2009/0166121 | A1 | * | 7/2009 | Hiramatsu et al. | 180/291 |
| 2009/0183707 | A1 | * | 7/2009 | Sasaki | 123/179.17 |
| 2010/0032226 | A1 | * | 2/2010 | Yokoi | 180/229 |
| 2010/0243365 | A1 | * | 9/2010 | Mori et al. | 180/292 |
| 2011/0192669 | A1 | * | 8/2011 | Yokoi et al. | 180/219 |

FOREIGN PATENT DOCUMENTS

JP  2008-207789  11/2008

* cited by examiner

*Primary Examiner* — Katy M Ebner
*Assistant Examiner* — Emma K Frick
(74) *Attorney, Agent, or Firm* — Squire Sanders (US) LLP

(57) ABSTRACT

A motorcycle is provided that includes a connecting pipe, a throttle body, an intake pipe, and an air cleaner, which are intake system parts disposed forward of a cylinder of an engine and are connected to the front side of the cylinder. The motorcycle further includes an exhaust pipe and a muffler, which are exhaust system parts connected to the rear side of the cylinder. The cylinder is inclined rearward, and the exhaust pipe of an exhaust system part extends forward along one side of the motorcycle in a widthwise direction of the engine 50 and detours the front of the engine and then extends rearward along the other side of the motorcycle in a widthwise direction of the engine.

2 Claims, 4 Drawing Sheets

MOTORCYCLE ENGINE

FIELD

Embodiments of the invention relate to a motorcycle, and more particularly to an engine for a motorcycle.

DESCRIPTION OF RELATED ART

Conventionally, a motorcycle includes a rearwardly inclined cylinder of an engine and an intake system part, whereby the intake system part is connected to the front side of the engine while an exhaust system part is connected to the rear side of the engine (see Japanese Patent Laid-Open No. 2008-207789 ["JP-207789"]).

In the motorcycle disclosed in JP-207789, since an exhaust pipe, which serves as an exhaust path, is complicated in structure, a flow of exhaust gas may be obstructed, thereby making it difficult to produce a smooth exhaust. Further, an adjustment of the length of the exhaust pipe may be difficult and the mass of the exhaust pipe may be concentrated in the rear of the motorcycle.

SUMMARY

Embodiments of the invention have been made in view of the situation as described above. Embodiments of the invention provide for a motorcycle, whereby smooth exhaust can be achieved, an optimum length of an exhaust pipe can be easily set, and a concentration of the mass of the motorcycle can be achieved.

In accordance with one embodiment of the invention, there is provided a motorcycle that includes an engine disposed between a front wheel and a rear wheel. The motorcycle further includes an intake system part disposed forward of a cylinder of the engine and connected to the front side of the cylinder, and an exhaust system part connected to the rear side of the cylinder. The cylinder can be rearwardly inclined. An exhaust pipe of the exhaust system part can extend forward along one side of the motorcycle in a widthwise direction of the engine, can wrap around the front of the engine, and can extend rearward along the other side of the motorcycle in the widthwise direction of the engine.

In accordance with another embodiment of the invention, there is provided a motorcycle. The motorcycle can include engine means for driving the motorcycle. The engine means can be disposed between a front wheel and a rear wheel. The motorcycle further can include intake system means for receiving air. The intake system means can be disposed forward of a cylinder of the engine means and can be connected to a front side of the cylinder. Further, the motorcycle can include exhaust system means for discharging exhaust connected to a rear side of the cylinder. The cylinder can be inclined rearward. The exhaust pipe of the exhaust system means can be configured to extend forward along one side of the motorcycle in a widthwise direction of the engine means, to wrap around the front of the engine, and to extend rearward along the other side of the motorcycle in the widthwise direction of the engine means.

In accordance with another embodiment of the invention, the exhaust pipe can be disposed forward of the engine and can wrap around the front of a down frame that extends downward from a head pipe.

In accordance with another embodiment of the invention, the motorcycle can further include a muffler that can be connected to a downstream end of the exhaust pipe by a connecting part. The connecting part is positioned lower than an upper end portion of the engine.

In accordance with another embodiment of the invention, an upstream end of the exhaust pipe can be disposed at a position overlapping with a kick gear section of the engine as viewed in a side elevation of the motorcycle.

As a result of certain embodiments, since the exhaust pipe of the exhaust system part extends forward along one side of the motorcycle in the widthwise direction of the engine, wraps around the front of the engine, and then extends rearward along the other side of the motorcycle in the widthwise direction of the engine, a layout of the exhaust pipe can be easily carried out. Consequently, the exhaust pipe becomes simplified in structure and smooth exhaust can be achieved. Furthermore, since the degree of freedom in setting the length of the exhaust pipe can be enhanced, an optimum length of the exhaust pipe can be easily set. Furthermore, since the exhaust pipe can be disposed near the engine, the concentration of the mass of the motorcycle can be anticipated.

As a result of certain embodiments, since the exhaust pipe can be disposed forward of the engine, and can wrap around the front of the down frame, which extends downward from the head pipe, the length of the exhaust pipe can be secured long. Consequently, layout of the exhaust pipe can be easily carried out.

As a result of certain embodiments, since the muffler can be connected to the downstream end of the exhaust pipe by a connecting portion, whereby the connecting portion is disposed lower than the upper end portion of the engine, positions of the exhaust pipe and the muffler can be set low. Therefore, lower disposition of the center of gravity of the motorcycle can be achieved.

As a result of certain embodiments, since the upstream end of the exhaust pipe is disposed at a position overlapping with the kick gear section of the engine, as viewed in a side elevation of the motorcycle, a dead space sideward of the kick gear section can be effectively and efficiently utilized to lay out the exhaust pipe.

DETAILED DESCRIPTION OF EMBODIMENTS

Figure 1:
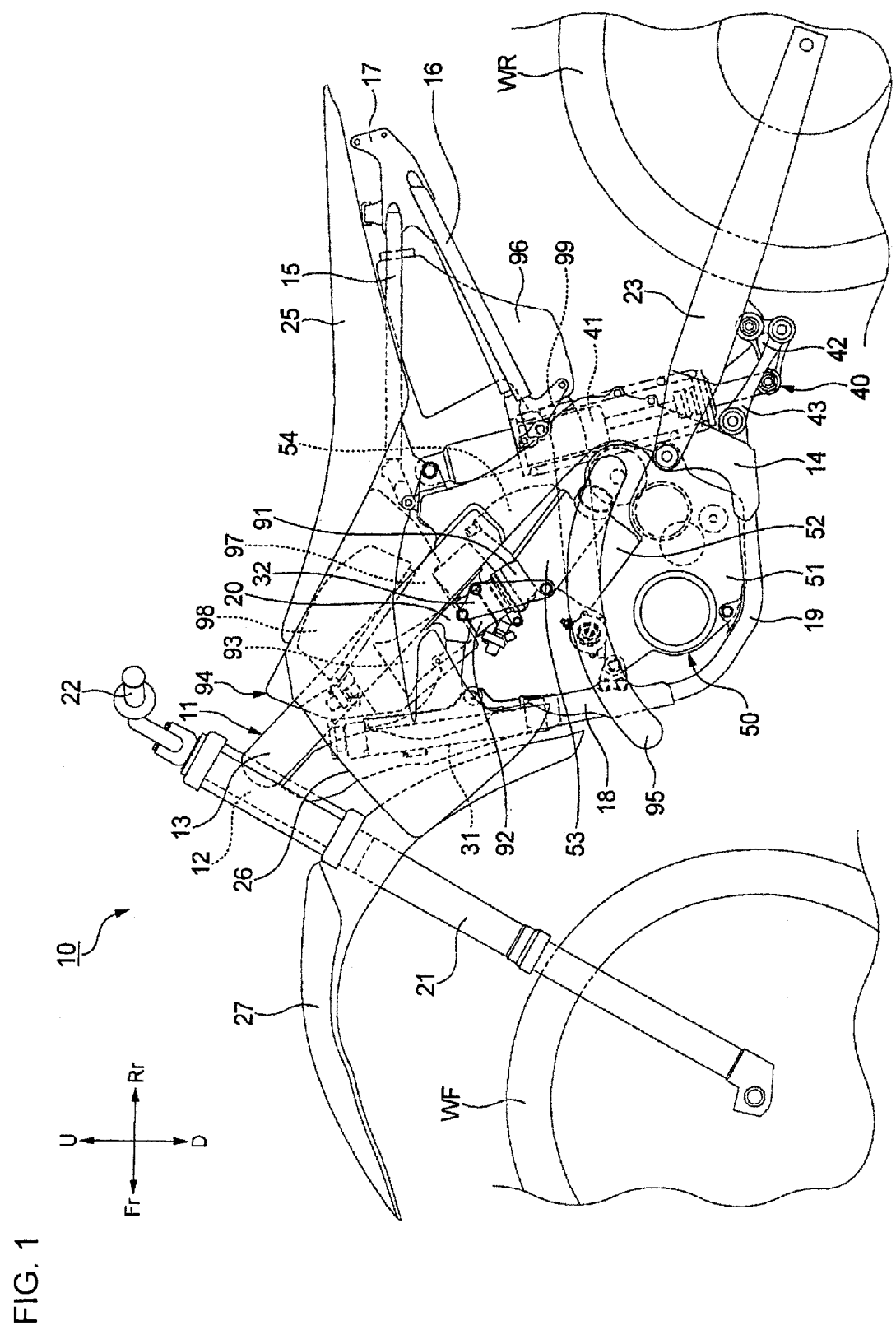
FIG. 1 is a left side elevation view of a motorcycle, in accordance with an embodiment of the invention.

An embodiment of a motorcycle in accordance with the invention is described in detail with reference to the drawings. It is to be noted that the drawings should be viewed in the direction of reference characters, and in the following description, the forward, rearward, leftward, rightward, upward and downward directions are those as viewed from a driver. Further, in the drawings, the front side of the vehicle is denoted by Fr, the rear side by Rr, the left side by L, the right side by R, the upper side by U and the lower side by D.

As illustrated in FIG. 1, the motorcycle 10 can include a vehicle body frame 11 that can include a head pipe 12 provided at the front end, a pair of left and right main frames 13 branched to the left and right from the head pipe 12 and extending rearward downward, a pair of left and right pivot frames 14 connected to rear end portions of the main frames 13 and extending downward, and a pair of left and right rear frames 15 connected to upper end portions of the pivot frames 14 and extending rearward. The vehicle body frame 11 can further include a pair of left and right sub frames 16 connected to intermediate portions of the pivot frames 14 and extending rearward and upward, a rear bracket 17 to which rear end portions of the pair of left and right rear frames 15 and the pair of left and right sub frames 16 are connected, and a pair of left and right down frames extending downward from the head pipe 12. Further, the vehicle body frame 11 can include a bottom frame 19 for connecting lower end portions of the down frames 18 and lower end portions of the pivot frames 14 to each other, and a pair of left and right engine supporting frames 20 for connecting intermediate portions of the down frames 18 and rear portions of the main frames 13 to each other. An engine 50 can be suspended on the down frames 18, bottom frame 19, and engine supporting frames 20.

Further, according to an embodiment of the invention, the motorcycle 10, as illustrated in FIG. 1, can include a front fork 21 supported for steering movement on the head pipe 12, a front wheel WF supported for rotation at a lower end portion of the front fork 21, and a steering bar handle 22 mounted at an upper end portion of the front fork 21. The motorcycle 10 can further include a swing arm 23 supported for rocking motion on the pivot frames 14, a rear wheel WR supported for rotation at a rear end portion of the swing arm 23, a rear wheel suspension apparatus 40 for suspending the swing arm 23 on the pivot frames 14, and a seat 25 mounted upward of the rear frames 15. As further illustrated in FIG. 1, reference numeral 26 denotes a shroud for covering of the main frames 13 and the down frames 18, and reference numeral 27 denotes a front fender for covering the front wheel WF.

As further illustrated in FIG. 1, the rear wheel suspension apparatus 40 can include a rear cushion 41 mounted at an upper end portion thereof for rocking motion at upper end portions of the pivot frames 14, a first link 42 including a substantially triangular shape for connecting a lower end portion of the rear cushion 41 and a lower side intermediate portion of the swing arm 23 for rocking motion relative to each other. The rear wheel suspension apparatus 40 can further include a second link 43 for connecting the first link 42 and lower end portions of the pivot frames 14 for rocking motion relative to each other.

Figure 2:
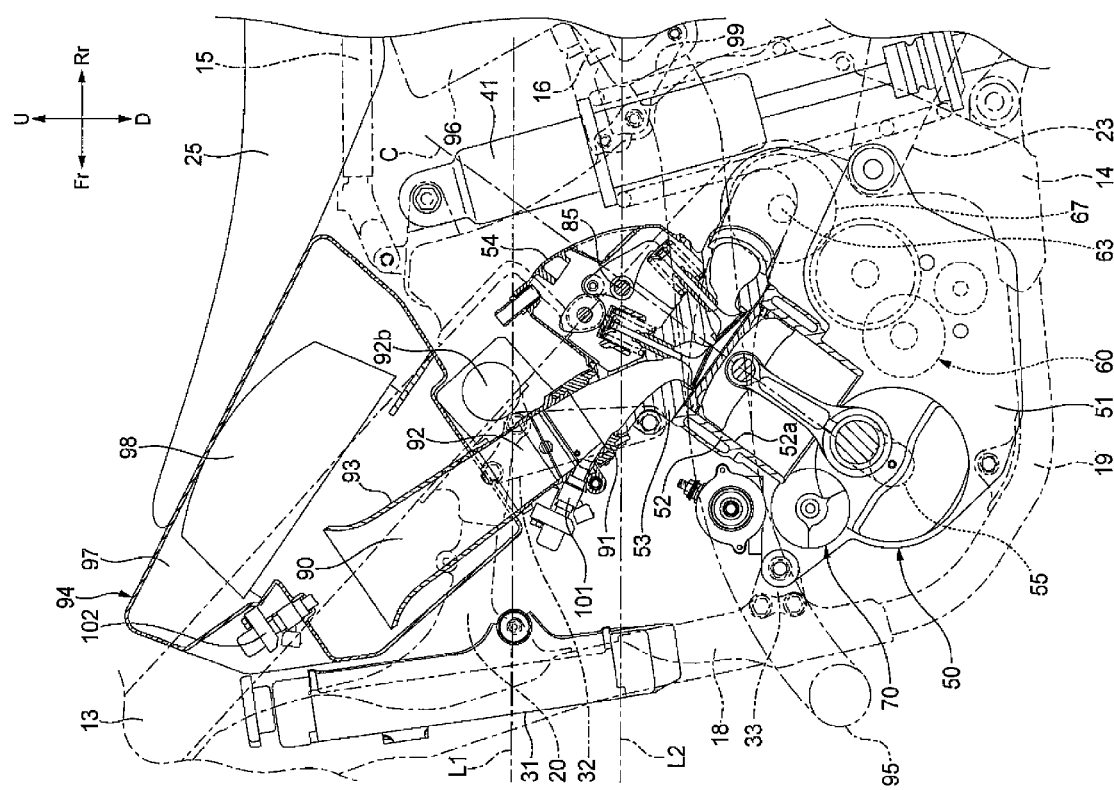
FIG. 2 is a left side elevation view of peripheral elements of an engine illustrated in FIG. 1, in accordance with an embodiment of the invention.

The engine 50 can be, for example, a water-cooled type, single-cylinder engine. As illustrated in FIGS. 1 and 2, a shell of the engine 50 can include a crankcase 51, a cylinder block 52 mounted at a front upper end portion of the crankcase 51, a cylinder head 53 mounted at an upper end portion of the cylinder block 52, and a cylinder head cover 54 for covering an upper opening of the cylinder head 53. Further, a radiator 31 for cooling the cooling water, which circulates in the engine 50, can be mounted on the down frames 18 disposed forward of the engine 50.

Further, as illustrated in FIG. 2, the engine 50 can be suspended by bolt fastening at an intermediate location along with an engine hanger plate 32 bolt-fastened to a rear portion of the engine supporting frames 20, and an engine hanger plate 33 bolt-fastened to a lower end portion of the down frames 18 and the bottom frame 19. The engine can be is disposed between the front wheel WF and the rear wheel WR.

Figure 3:
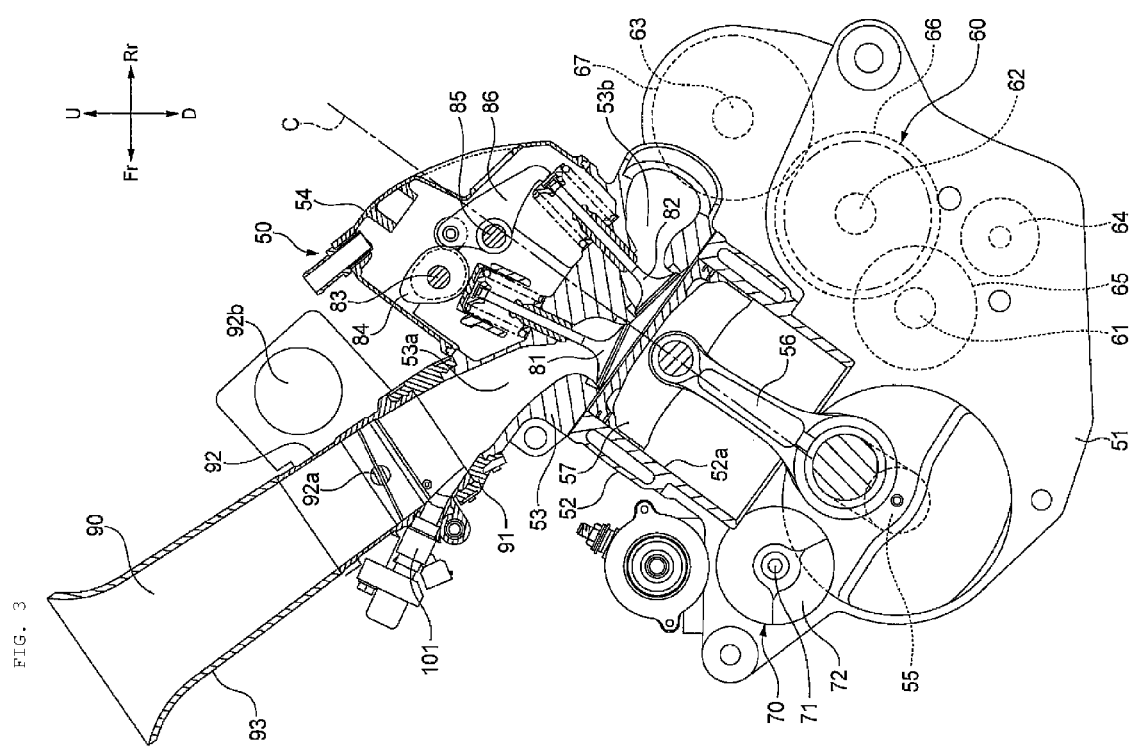
FIG. 3 is a left side elevation view of the engine illustrated in FIG. 2, in accordance with an embodiment of the invention.

Further, as illustrated in FIG. 3, a crankshaft 55 can be supported for rotation on the crankcase 51, and a piston 57 can be connected to the crankshaft 55 through a connecting rod 56. The piston 57 carries out reciprocating motion in a cylinder axial line C direction in a cylinder 52a of the cylinder block 52. Further, in accordance with an embodiment of the invention, the cylinder axial line C can be disposed in a rearward and inclined relationship on the rear of the motorcycle.

Further, a change gear 60 can be accommodated in a rear portion of the crankcase 51, and can include a main shaft 61, a counter shaft 62 supported for rotation on the crankcase 51, and a kick shaft 63 for kick starting the motorcycle 10. The crankcase 51 can further include a shift drum 64, a plurality of driving gears 65 provided on the axis of the main shaft 61, a plurality of driven gears 66 provided on the axis of the counter shaft for meshing with the plural driving gears 65, and a kick gear (kick gear section) 67 provided on the axis of the kick shaft 63 and for meshing with the driven gears 66.

Further, a balancer 70 can be accommodated in a front portion of the crankcase 51, and can include a balancer shaft 71 supported for rotation on the crankcase 51 and a balance weight 72 provided on the balancer shaft 71. Further, the balancer 70 can be driven to rotate by driving force of the crankshaft 55.

As further illustrated in FIG. 3, the cylinder head 53 can include an intake valve 81 for opening and closing an intake port 53a formed on the front face of the cylinder head 53, and an exhaust valve 82 for opening and closing an exhaust port 53b formed on the rear face of the cylinder head 53. The cylinder head 53 can further include a camshaft 83 supported for rotation on the cylinder head 53, a cam 84 provided on the camshaft 83, a rocker shaft 85 provided on the cylinder head 53, and a rocker arm 86 supported coaxially for rocking motion on the rocker shaft 85 and rocked by the cam 84. The intake valve 81 can be directly driven by the cam 84 and the exhaust valve 82 can be driven by the rocker arm 86. In other words, the engine 50 can be an SOHC engine.

Further, as illustrated in FIGS. 2 and 3, a throttle body 92 can be connected to the intake port 53a of the cylinder head 53 through a connecting pipe 91. An air cleaner 94 can be connected to an upstream end of the throttle body 92 through an intake pipe 93. Further, in accordance with an embodiment of the invention, the connecting pipe 91, throttle body 92, intake pipe 93, and air cleaner 94 are intake system parts and can be disposed forward and upward of the cylinder block 52. Further, in accordance with an embodiment of the invention, the connecting pipe 91, throttle body 92 and intake pipe 93 can form an intake path 90.

Further, as illustrated in FIG. 2, an exhaust pipe 95 can be connected to the exhaust port 53b of the cylinder head 53, and a muffler 96 is connected to a downstream end of the exhaust pipe 95. Further, in accordance with an embodiment of the invention, the exhaust pipe 95 and the muffler 96 are exhaust system parts.

The throttle body 92 can include a throttle valve 92a for opening and closing the intake path 90, a controlling motor 92b for controlling the degree of the opening of the throttle valve 92a, and a first injector 101 for injecting fuel to the intake port 53a.

The air cleaner 94 can include an air cleaner box 97, an air cleaner element 98 accommodated in the air cleaner box 97, and a second injector 102 for injecting fuel to an entrance opening of the intake pipe 93.

Figure 4:
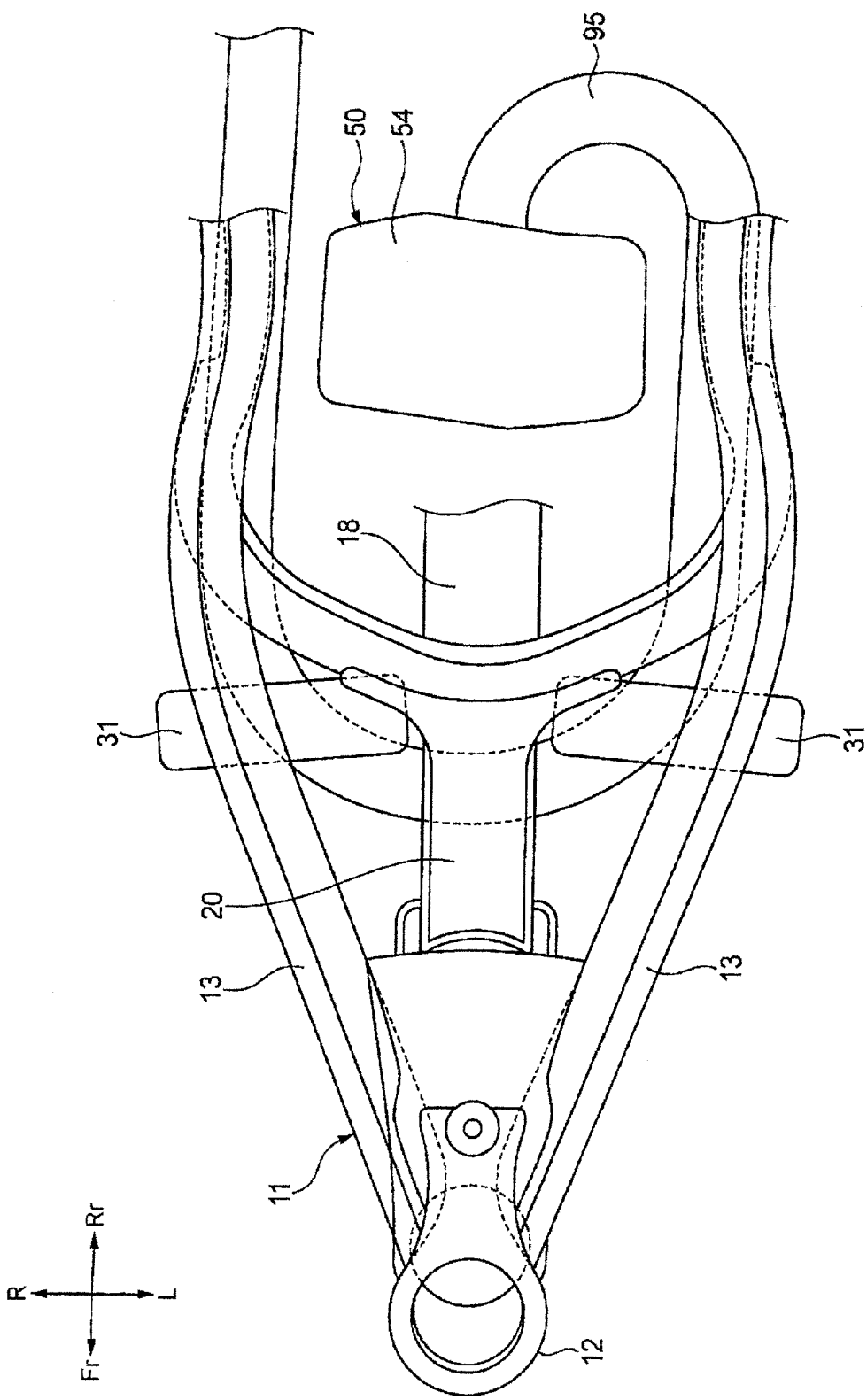
FIG. 4 is a top plan view of a vehicle body frame, the engine, and an exhaust pipe, in accordance with an embodiment of the invention.

In accordance with an embodiment of the invention, as illustrated in FIGS. 1, 2 and 4, the exhaust pipe 95 can extend forward from an upstream end thereof connected to the exhaust port 53b along the left side of the motorcycle in the widthwise direction of the engine 50, can wrap around the front of the engine 50 and the down frames 18, and then can extend rearwardly along the right side of the motorcycle in the widthwise direction of the engine 50. It is to be noted that the exhaust pipe 95 may otherwise be configured to extend forward from the upstream end thereof connected to the exhaust port 53b along the right side of the motorcycle in the widthwise direction of the engine 50, can wrap around the front of the engine 50 and the down frames 18, and then can extend rearward along the left side of the motorcycle in the widthwise direction of the engine 50.

Further, in accordance with another embodiment of the invention, as illustrated in FIG. 2, a connecting portion 99 between the exhaust pipe 95 and the muffler 96 can be disposed lower than a horizontal line L1, which passes an upper end portion of the cylinder head cover 54 of the engine 50. More particularly, the connecting portion 99 can be disposed lower than a horizontal line L2, which passes the axis center of the rocker shaft 85 disposed in the cylinder head 53.

Further, in accordance with another embodiment of the invention, as illustrated in FIG. 2, an upstream end of the exhaust pipe 95 can be disposed at a position overlapping with the kick gear 67, which is a kick gear section disposed in the crankcase 51 of the engine 50.

Thus, in accordance with an embodiment of the invention, as previously described, since the exhaust pipe 95 of an exhaust system part extends forward along the left side of the motorcycle in the widthwise direction of the engine 50, wraps around the front of the engine 50, and then extends backward along the right side of the motorcycle in the widthwise direction of the engine 50, a layout of the exhaust pipe 95 can be facilitated. Therefore, the exhaust pipe 95 becomes simplified in structure and smooth exhaust can be carried out. Further, since the degree of freedom in setting the length of the exhaust pipe 95 can be enhanced, an optimum length of the exhaust pipe 95 can be easily set. Furthermore, since the exhaust pipe 95 can be closely disposed to the engine 50, concentration of the mass of the motorcycle 10 can be anticipated.

Furthermore, in accordance with an embodiment of the invention, as previously described, since the exhaust pipe 95 can be configured long by wrapping the exhaust pipe 95 around the front of the down frame 18, the layout of the exhaust pipe 95 can be further facilitated.

Furthermore, in accordance with an embodiment of the invention, as previously described, since the muffler 96 can be connected to the downstream end of the exhaust pipe 95 and the connecting portion 99 thereof can be disposed lower than the horizontal line L1, which passes the upper end portion of the cylinder head cover 54 of the engine 50, the positions of the exhaust pipe 95 and the muffler 96 can be set low. Therefore, lower disposition of the center of gravity of the motorcycle 10 can be anticipated.

Further more, in accordance with an embodiment of the invention, as previously described, since, as viewed in the side elevation of the motorcycle, the upstream end of the exhaust pipe 95 can be disposed at a position overlapping with the kick gear 67, which is a kick gear section of the engine 50, a dead space to the side of the kick gear 67 can be effectively and efficiently utilized to lay out the exhaust pipe 95.

DESCRIPTION OF REFERENCE SYMBOLS

10 Motorcycle
12 Head pipe
18 Down frame
50 Engine
52a Cylinder
54 Cylinder head cover
67 Kick gear (kick gear section)
91 Connecting pipe (intake system part)
92 Throttle body (intake system part)
93 Intake pipe (intake system part)
94 Air cleaner (intake system part)
95 Exhaust pipe (exhaust system part)
96 Muffler (exhaust system part)
99 Connecting portion
WF Front wheel
WR Rear wheel
L1 Horizontal line passing upper end portion of cylinder head cover

We claim:

1. A motorcycle, comprising:

an engine disposed between a front wheel and a rear wheel;

an intake system part disposed forward of a cylinder of said engine and connected to a front side of said cylinder;

an exhaust system part connected to a rear side of said cylinder, wherein said cylinder is inclined rearward, wherein an exhaust pipe of said exhaust system part is configured to extend forward along one side of the motorcycle in a widthwise direction of said engine, to wrap around the front of said engine, and to extend rearward along the other side of the motorcycle in the widthwise direction of said engine, and wherein said exhaust pipe is disposed forward of said engine and configured to wrap around the front of a down frame that is configured to extend downward from a head pipe; and a muffler connected to a downstream end of the exhaust pipe, and wherein the muffler is disposed upwardly of a swing arm, wherein at least a portion of an upstream end of said exhaust pipe is disposed in an area at approximately the same elevation and distance from a front of the motorcycle as a kick gear section, wherein the muffler is connected to the downstream end of said exhaust pipe by a connecting part, and the connecting part is positioned lower than an upper end portion of said engine, and wherein a length of the portion of the exhaust pipe that extends about said one side of the motorcycle is positioned at a same elevation as a length of the portion of the exhaust pipe that extends about said other side of the motorcycle.

2. A motorcycle, comprising:

engine means for driving the motorcycle, the engine means being disposed between a front wheel and a rear wheel;

intake system means for receiving air, the intake system means being disposed forward of a cylinder of said engine means and connected to a front side of said cylinder;

exhaust system means for discharging exhaust connected to a rear side of said cylinder, wherein said cylinder is inclined rearward, wherein an exhaust pipe of said exhaust system means is configured to extend forward along one side of the motorcycle in a widthwise direction of said engine means, to wrap around the front of said engine, and to extend rearward along the other side of the motorcycle in the widthwise direction of said engine means, and wherein said exhaust pipe is disposed forward of said engine means and configured to wrap around the front of a down frame that is configured to extend downward from a head pipe; and a muffler connected to a downstream end of the exhaust pipe, and wherein the muffler is disposed upwardly of a swing arm, wherein at least a portion of an upstream end of said exhaust pipe is disposed in an area at approximately the same elevation and distance from a front of the motorcycle as a kick gear section, wherein the muffler is connected to the downstream end of said exhaust pipe by a connecting part, and the connecting part is positioned lower than an upper end portion of said engine means, and wherein a length of the portion of the exhaust pipe that extends about said one side of the motorcycle is positioned at a same elevation as a length of the portion of the exhaust pipe that extends about said other side of the motorcycle.

* * * * *